UNITED STATES PATENT OFFICE.

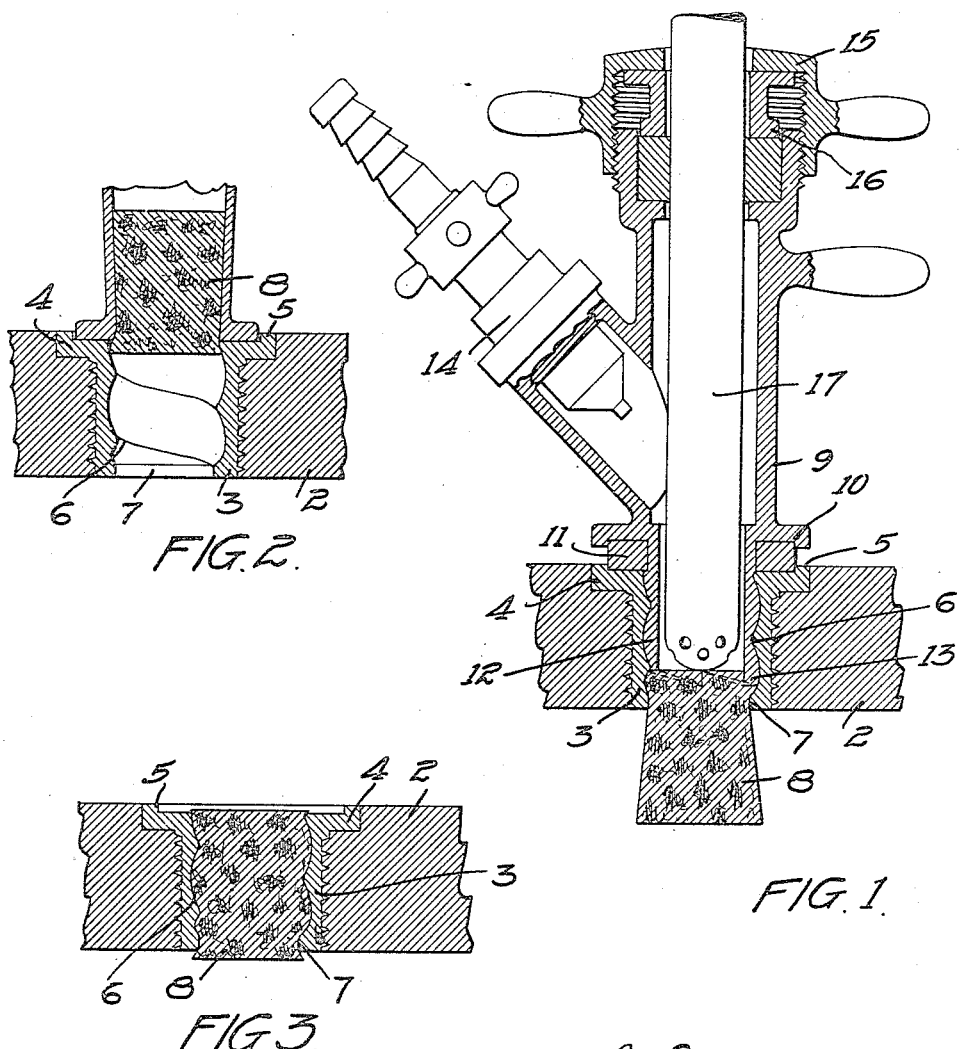

EMIL CHRISTENSEN, OF PORTLAND, OREGON.

TAPPING DEVICE.

1,245,088. Specification of Letters Patent. Patented Oct. 30, 1917.

Application filed June 1, 1914. Serial No. 842,080.

*To all whom it may concern:*

Be it known that I, EMIL CHRISTENSEN, citizen of the United States, resident of Portland, county of Multnomah, State of Oregon, have invented certain new and useful Improvements in Tapping Devices, of which the following is a specification.

My invention relates to a device for tapping barrels, kegs, or other liquid receptacles for the removal of the contents, and particularly for tapping beer kegs, the device being applied at the faucet hole that is sealed by any of the ordinary faucet plugs or bungs.

The object of my invention is to provide a tap bushing for fitting within the hole in the barrel or keg and having means for engaging the sealing cork to hold it securely and at the same time present a smooth surface on which sediment and foreign matter cannot lodge, and a surface which will not tear or mutilate the cork.

A further object is to provide a bushing which will provide a positive seal for the cork, will permit the use of a common wooden faucet when a tap is not available, and will not require the use of a special plug when the barrel is pitched, as it often is in some of the breweries when returned empty.

Other objects of the invention will appear from the following detailed description.

The invention consists generally in various constructions and combinations, all as hereinafter described and particularly pointed out in the claims.

In the accompanying drawings forming part of this specification,

Figure 1 is a vertical sectional view through a tapping device embodying my invention, showing its application to a barrel, Fig. 2 is a detail sectional view, showing a cork in position to be forced into the bushing, Fig. 3 is a similar view, showing the cork in its sealing position within the bushing, Fig. 4 is a detail view of the end of the tap plunger, In the drawing, 2 represents the head of a barrel or keg and 3 is a bushing inserted into the bung or faucet hole therein and having a laterally extending flange 4 at its outer end terminating in a rib or lip 5 that is flush substantially with the surface of the head when the bushing is inserted therein. This flange, with the rib or lip, has the function of centering the tap corker or corking machine, and the rib prevents the gasket seated on the flange from spreading when the tap is screwed into the bushing, and also forms an edge for tearing a hole in the government stamp, which, by statute, must be placed over the tap hole and not entirely removed when the receptacle is tapped.

The inner surface of the bushing has a coarse thread 6 formed thereon, which terminates before reaching the inner end of the bushing to provide a circular opening 7 at said inner end. A cork 8 or other suitable plug is forced into the bushing and held by the rib of the thread therein, the inner end of the cork being forced through the circular opening 7 and gripped by the walls thereof and completely sealing the opening through the bushing.

The coarse, wide thread of the bushing, while gripping the cork or plug securely, will not cut or tear it, as ordinary threads would, and the inner surface of the bushing, being comparatively smooth, no particles of foreign material can lodge thereon and contact with the contents of the barrel. Furthermore, this form of thread will permit the use of a common wooden faucet, where the tap designed for the purpose may not be convenient or available. A tap barrel 9 is provided, having a flange 10 between which and the flange 4 a packing ring 11 is inserted, and at the end of the barrel is a threaded portion 12 that is formed to fit the coarse thread on the inner surface of the bushing and force the cork or plug inwardly through the bushing when it is desired to draw off the contents of the barrel. For convenience, the inner end of the tap 12 may be provided with teeth 13, but this is not essential, as the engagement of the thread on the tap with the thread of the bushing will insure the dislodgement of the cork or plug when the tapping device is rotated. The tap barrel 9 has an air supply attachment 14 of ordinary construction, and at its outer end is provided with a nut 15 engaging the exteriorly threaded end of the barrel in which a packing gland 16 is arranged to encircle the tapping tube 17 that is inserted through the nut 15 and the tap barrel and through the bushing into the contents of the barrel in the usual way. I make no claim to this feature of the device, as it is old in articles of this kind, the invention consisting in the tap bushing having the coarse threads and the circular opening at its inner end coöperating with the tap, which has coarse threads to engage with the threads of the bushing.

I have found that by providing the bushing with a circular opening at its inner end having plain walls, that a sure seal for the cork is formed, as it will fit snugly against the plain surface, whereas, when the bushing is threaded from end to end, the sharp edge of the thread will not form a tight joint with the cork, but permit a leak around the cork, following lengthwise of the thread. I regard this feature, therefore, as an important part of my invention.

In various ways the details of construction herein shown and described may be modified and still be within the scope of my invention.

I claim as my invention:

1. A tapping device having a bushing adapted to be inserted into the bung or faucet-hole of a barrel head and having a coarse thread on its inner surface for engagement with the walls of a cork inserted into said bushing, said thread being in the form substantially of a spiral rib projecting into the opening through the bushing and the wall of the bushing being concave between the convolutions of said rib and curved to allow the cork to slide freely thereon, a tap having an end portion to fit into said bushing and engage said cork, the surface of said end portion having a spirally formed recess to receive said rib and a convex curved surface to coöperate with the oppositely curved surface of said bushing when the tap is inserted therein, and the inner end of said bushing having a smooth internal surface against which the end of the cork is seated to form a seal therefor.

2. A tapping device having a bushing adapted to be inserted into the bung or faucet hole of a barrel head and having a coarse thread on its inner surface for engagement with the walls of a cork inserted into said bushing, said thread being in the form substantially of a spiral rib projecting into the opening through the bushing, and the wall of the bushing being concave between the convolutions of said rib and curved to allow the cork to slide freely thereon, a tap having an end portion to fit into said bushing and engage said cork, the surface of said end portion having a spirally formed recess to receive said rib and a convex curved surface to coöperate with the oppositely curved surface of said bushing when said tap is inserted therein.

In witness whereof, I have hereunto set my hand this 25th day of May 1914.

EMIL CHRISTENSEN.

Witnesses:
H. V. CARPENTER,
J. F. HUEN.

Copies of this patent may be obtained for five cents each, by addressing the "Commissioner of Patents, Washington, D. C."